(12) United States Patent
Doser et al.

(10) Patent No.: US 11,297,250 B2
(45) Date of Patent: Apr. 5, 2022

(54) IMAGE RECORDING METHOD AND IMAGE RECORDING DEVICE

(71) Applicant: Scholly Fiberoptic GmbH, Denzlingen (DE)

(72) Inventors: Ingo Doser, Villingen-Schwenningen (DE); Nicole Giessler, Triberg (DE); Alexander Raiola, Furtwangen (DE); Sebastien Weitbruch, Niedereschach (DE); Andreas Hanselmann, Freiburg (DE); Clemens Meier, Seelbach (DE); Mateusz Cichosz, Freiburg (DE); Jochen Dietrich, Elzach (DE); Massimo Kubon, Emmendingen (DE); Patrick Spring, Freiburg (DE)

(73) Assignee: Schölly Fiberoptic GmbH, Denzlingen (DE)

( * ) Notice: Subject to any disclaimer, the term of this patent is extended or adjusted under 35 U.S.C. 154(b) by 0 days.

(21) Appl. No.: 16/702,973

(22) Filed: Dec. 4, 2019

(65) Prior Publication Data

US 2020/0186694 A1 Jun. 11, 2020

(30) Foreign Application Priority Data

Dec. 5, 2018 (DE) .......................... 102018131009.9

(51) Int. Cl.
*H04N 5/00* (2011.01)
*H04N 5/235* (2006.01)
*H04N 5/225* (2006.01)

(52) U.S. Cl.
CPC ......... *H04N 5/2352* (2013.01); *H04N 5/2256* (2013.01); *H04N 2005/2255* (2013.01)

(58) Field of Classification Search
CPC ............. H04N 5/00; G03B 7/00; G03B 15/00
See application file for complete search history.

(56) References Cited

U.S. PATENT DOCUMENTS

| 5,191,369 | A | 3/1993 | Furuya et al. |
| 2004/0257438 | A1 | 12/2004 | Doguchi et al. |
| 2011/0069199 | A1* | 3/2011 | Yamazaki ............ A61B 1/0005 348/229.1 |
| 2015/0250555 | A1* | 9/2015 | Haverich .................. F21L 4/00 600/245 |

FOREIGN PATENT DOCUMENTS

| DE | 4128921 | 8/1995 |
| DE | 102016002800 | 4/2017 |

* cited by examiner

*Primary Examiner* — Maryam A Nasri
(74) *Attorney, Agent, or Firm* — Volpe Koenig (57) ABSTRACT

An image recording method (100) and an image recording device (1) for recording a sequence of single images of a scene (3) are provided, wherein the scene (3) is illuminated using an illumination unit (4), a light intensity generated by the illumination unit (4) is characterized by an illumination variable (47), a setting of the illumination variable (47) is performed as long as a regulating reserve (19) of an optimum regulating range (39) of the exposure parameter (46) is present, and a setting of the illumination variable (47) is performed or repeated until the illumination variable (47) is within an optimum regulating range (30) of the illumination variable (47).

19 Claims, 5 Drawing Sheets

IMAGE RECORDING METHOD AND IMAGE RECORDING DEVICE

INCORPORATION BY REFERENCE

The following documents are incorporated herein by reference as if fully set forth: German Patent Application No. DE 102018131009.9, filed Dec. 5, 2018.

TECHNICAL FIELD

The invention relates to an image recording method for recording a sequence of single images of a scene using an image recording device, wherein the scene is illuminated using an illumination unit, wherein a setting of an exposure parameter is performed in dependence on a respective brightness value of a single image in a first control loop, wherein a light intensity generated by the illumination unit is characterized by an illumination variable.

The invention moreover relates to an image recording device for recording a sequence of single images of a scene, wherein the image recording device comprises an illumination unit for illuminating the scene, wherein a light intensity generated by the illumination unit is characterized by an illumination variable. For example, the image recording device can be an endoscope. The endoscope can be configured, for example, for medical applications and/or for examining cavities which are difficult to access. In particular it can be a CIT endoscope ("CIT" as an abbreviation for "chip-in-the-tip").

BACKGROUND

Image recording methods and image recording devices of the type mentioned at the outset are already known. In general, in previously known image recording methods and image recording devices, a regulating range which is comprised of an exposure time regulating range and an amplification factor regulating range is used as the exposure parameter. A control of a light intensity of the illumination unit is generally performed manually by a user. This has the disadvantage that a setting of an optimum exposure situation frequently takes a very long time and/or a set light intensity is excessively high.

In particular in medical technology, however, the problem results that different amounts of light are required depending on an illumination situation to be able to achieve a nearly uniform image quality in recorded images. While in the case of an excessive amount of light, an image sensor of the image recording device can take countermeasures by a setting of the exposure parameter, in the case of excessively little light, significant quality losses are to be expected. In this case, either the recorded image is displayed excessively dark or it is amplified by an amplification factor ("gain"), whereby image noise and other artifacts can occur in amplified form, which results in an overall poor image quality.

In addition, it is known that high light intensities are also accompanied by an elevated temperature development on the illumination unit. This can result in tissue damage in particular in the case of medical applications, in which an endoscope is used. In particular in systems in which an illumination unit is arranged close to the patient, an enormous temperature development can occur on the tissue of the patient due to a power dissipation of the light source of the illumination unit. However, limiting values, which are defined in the norm DIN EN 60601, are to be observed for the resulting temperatures in medical technology.

SUMMARY

The invention is thus based on the object of remedying the above-mentioned disadvantages to improve the usage properties of an image recording method and/or an image recording device of the respective type mentioned at the outset.

This object is achieved according to the invention by an image recording method having one or more features of the invention. In particular, an image recording method of the type mentioned at the outset is provided to achieve the object according to the invention, wherein a setting of the illumination variable is performed in a second control loop as long as a regulating reserve of the exposure parameter is present. This has the advantage that a controllability of the illumination unit is possible in consideration of a current value of the exposure parameter. In particular, it is thus possible to perform an automated regulation of the illumination unit. By way of the consideration of the exposure parameter and its new setting, both the illumination variable and also the exposure parameter can thus be adjusted in the direction of an optimum by the image recording method according to the invention. The regulation of the illumination unit can thus be performed by the image recording device in this case. This has the advantage that, for example, a reduction of the light intensity can be performed if this reduction can be balanced out by an increase of the exposure parameter. However, balancing is only possible if a regulating reserve of the exposure parameter is present in the second control loop. This type of the regulation has the advantage that a lower temperature development occurs with at least approximately uniform image impression and/or uniform image quality. Noise or other artifacts can thus be avoided, since, vice versa, an amplification factor can also be reduced if the light intensity is increased simultaneously without temperature limiting values being exceeded. A better image quality of a recorded image can thus also be achieved.

Advantageous designs of the invention are described hereafter, which can optionally be used alone or in combination with other features of the invention as well as other designs.

According to one advantageous refinement, it can be provided that an optimum regulating range of the illumination variable, which is within an overall regulating range of the illumination variable, is defined or predefined in the second control loop, a check is performed as to whether a current value of the illumination variable is within the optimum regulating range of the illumination variable, a change of the illumination variable is performed if the current value of the illumination variable is outside the optimum regulating range of the illumination variable. The optimum regulating range is narrower than the overall regulating range in this case. For example, a change of the illumination variables can be performed until the current value of the illumination variable is within the optimum regulating range of the illumination variable. It can be particularly advantageous in this case if the change of the illumination variable takes place automatically if the current value of the illumination variable is outside the optimum regulating range. The optimum regulating range of the illumination variable can be defined, for example, by a lower limiting value and an upper limiting value, wherein an optimum setting between brightness and tissue-protecting light power is achieved here.

According to a further advantageous design of the image recording method, the limits of the regulating reserve can be defined or predefined by limiting values of an optimum regulating range of the exposure parameter, wherein the optimum regulating range is within an overall regulating range of the exposure parameter, wherein a change of the illumination variable can be performed until a current value of the exposure parameter is within the optimum regulating range of the exposure parameter and as long as a current value of the illumination variable is still within the optimum regulating range of the illumination variable. The optimum regulating range is narrower than the overall regulating range in this case.

According to one design of the image recording method, the exposure parameter can be an amplification factor and/or an exposure time and/or an aperture setting. According to one preferred design, it can be provided that the exposure parameter is composed of an exposure time and an amplification factor, wherein a regulation of the amplification factor begins after reaching a maximum exposure time. A maximum exposure time can be equated to a minimal shutter speed and vice versa in this case. For example, for this purpose an image sensor having an electronic shutter can be used, which controls the exposure time and/or the shutter speed.

According to a further advantageous design of the image recording method, the illumination variable can be a parameter or a combination of two or more parameters from the group at least of a light intensity of the illumination unit, a power consumption of the illumination unit, a temperature of the illumination unit, an ambient temperature, and/or a control signal of the illumination unit. As was already mentioned at the outset, a temperature development at the illumination unit is decisively dependent on a set light intensity. The above-mentioned illumination variables accordingly directly or indirectly characterize a set light intensity and thus also a temperature to be expected of the illumination unit. A plurality of the above-mentioned parameters can also be set simultaneously by the image recording method.

To avoid a worsening of the image quality due to an incorrect setting of the illumination variables, it can be provided according to a further design of the image recording method that regulation of the illumination variable is not performed if a current value of the illumination variable is within an optimum regulating range of the illumination variable, for example, within the above-mentioned optimum regulating range of the illumination variable.

To avoid a further incorrect setting of the illumination variables, it can be provided according to a further design of the image recording method that setting of the illumination variable is not performed if the exposure parameter is outside the optimum regulating range of the exposure parameter and a current value of the illumination variable corresponds to an upper or a lower limiting value of the optimum regulating range of the illumination variable. It is thus possible to prevent the illumination variable from being adjusted out of its optimum regulating range into a boundary range of the overall regulating range to set the exposure parameter in its optimum regulating range. The optimum setting of the illumination variable can thus be prioritized over the setting of the exposure parameter.

To be able to better prevent "pumping of the brightness" in the sequence of single images, for example, in a video signal, the setting of the illumination variable can be performed iteratively. In particular, it can be provided in this case that the setting of the illumination variable is performed at the shortest possible time intervals. The shortest possible time intervals can be dependent in this case on a number of recorded single images per unit of time and/or on a shortest integration time of the image sensor. Alternatively or additionally, it can furthermore be provided that in the event of a change of the illumination variable, an opposing change of the exposure parameter takes place.

For example, a reduction of the illumination variable, in particular a current value of the set light intensity, can thus be compensated for by an increase of the exposure parameter. An increase of the illumination variable, in particular a current value of the set light intensity, can also be compensated for by a reduction of the exposure parameter.

In specific situations, it can occur that a set value of the exposure parameter already corresponds to an upper limiting value, for example, of an optimum regulating range of the exposure parameter. If the exposure unit is now also set high or the external conditions have the result that a large heat development occurs, it can be provided that the illumination variable is reduced. To ascertain the current temperature, a measurement of a temperature of the illumination unit and/or an ambient temperature can additionally be performed. A temperature limiting value for the temperature of the illumination unit and/or for the ambient temperature can be defined or a predefined temperature limiting value can be selected. If the measured temperature valve reaches (for example, from below) or exceeds the temperature limiting value, an upper limiting value, for example, the above-mentioned upper limiting value, of the optimum regulating range of the illumination variable can then be reduced to a lower value or the illumination variable can actively be reduced to a lower value. A heat development by the light source or illumination unit is thus immediately reducible.

Alternatively or additionally thereto, an upper limiting value, for example, the above-mentioned upper limiting value, of the optimum regulating range of the exposure parameter can be increased. The image quality can indeed be worsened in this manner, however, this measure makes it better possible to prevent an excessively large heat development from occurring, which can result, for example, in tissue burns in the patients.

According to one preferred design, it can be provided in this case that the upper limiting value of the optimum regulating range of the exposure parameter is only increased if a current value of the exposure parameter, at the point in time of reaching or exceeding the temperature limiting value, corresponds to the original upper limiting value of the optimum regulating range of the exposure parameter. In this manner, it is possible to prevent a shift of the upper limiting value from occurring although a regulating reserve is still present.

Vice versa, it can be provided that if a measured temperature value, for example, the one already mentioned, of the illumination unit and/or an ambient temperature, for example, the one already mentioned, falls below a temperature limiting value, for example, the one already mentioned, it is automatically checked whether an increase of the current value of the illumination variable is required and advantageous. This can be advantageous, for example, to cancel out again throttling of the illumination unit, which was performed to avoid excess heat developments, but which can have the result of worsened image quality.

Alternatively or additionally, it can be provided in this case that it is checked whether an increase of an upper limiting value, for example, the one already mentioned, of the optimum regulating range of the illumination variable is required or advantageous. A clearance can thus be configured (again) to be able to increase the light intensity again if needed.

Alternatively or additionally, it can be provided in this case that it is checked whether an increase of an upper limiting value, for example, the one already mentioned, of the optimum regulating range of the exposure parameter is required or advantageous. A regulating reserve which was configured to avoid heat damage at the cost of the image quality can thus be withdrawn again.

In these cases, it can be provided in particular that the measure ascertained as required or advantageous is implemented automatically.

For this purpose (in particular in the last alternative) it can be provided that the upper limiting value of the optimum regulating range of the exposure parameter is only reduced if a current value of the exposure parameter at the point in time of falling below the temperature limiting value is below the current upper limiting value of the optimum regulating range of the exposure parameter. It is thus possible to avoid, for example, engaging in an uncontrolled manner in the first regulating loop.

According to a further design, it can be provided that the image recording method is executed using an image recording device designed as an endoscope. In this case, an image sensor and/or the illumination unit can be arranged in an endoscope tip. Due to the arrangement of the illumination unit in the endoscope tip, a particular risk exists of excessively high heat development in direct proximity to the patient. By use of the image recording method as described and claimed herein, it is thus possible to reduce the heat development to a minimum, wherein the image quality of the sequence of single images is nearly uniform at the same time.

According to a further advantageous design of the invention, it can be provided that a pulsed light source is used as the illumination unit, or the illumination unit is designed as a pulsed light source. It is thus possible that the time intervals in which an iterative setting of the illumination variable is performed by slight changes of the illumination variable in single steps following one another in close chronological succession are particularly short.

For example, it can be provided that at a flash frequency of 60 Hz of the illumination unit, a change of the illumination variable is performed at an interval of at most 25 ms, in particular at an interval of at most 20 ms, in particular at an interval of at most 16.6 ms. Alternatively or additionally, it can be provided according to a further design that at a flash frequency of 50 Hz of the illumination unit, a change of the illumination variable is performed at an interval of at most 30 ms, in particular at an interval of at most 25 ms, in particular at an interval of at most 20 ms.

The above-mentioned object is furthermore achieved by an image recording device having one or more features of the invention. In particular, an image recording device is provided to achieve the above-mentioned object which is capable of recording a sequence of single images of a scene, wherein the image recording device comprises an illumination unit for illuminating the scene, wherein a light intensity generated by the illumination unit is characterized by an illumination variable, and wherein the image recording device comprises an exposure controller for controlling an exposure parameter and an illumination controller for controlling the illumination variable, wherein a control connection is configured between the exposure controller and the illumination controller. Feedback of the second control loop on the first control loop is thus possible by way of the control connection to be able to perform the most optimum possible setting of the illumination variable, for example, in dependence on a regulating reserve of the exposure parameter. In particular, the setting of the illumination variable can be performed automatically by the image recording device.

According to one advantageous design of the image recording device, a setting of the illumination variable can be performed by the illumination controller in dependence on a current value of the exposure parameter.

The image recording device can be configured to execute the image recording method as described and claimed herein. In particular, the image recording device can execute the image recording method automatically if the criteria for this purpose described with respect to the image recording method are fulfilled.

BRIEF DESCRIPTION OF THE DRAWINGS

The invention will now be described in greater detail on the basis of an exemplary embodiment, but is not restricted to this exemplary embodiment. Further exemplary embodiments result by way of the combination of the features of individual or multiple claims with one another and/or with individual or multiple features of the exemplary embodiments.

In the figures.

DETAILED DESCRIPTION

Figure 1:
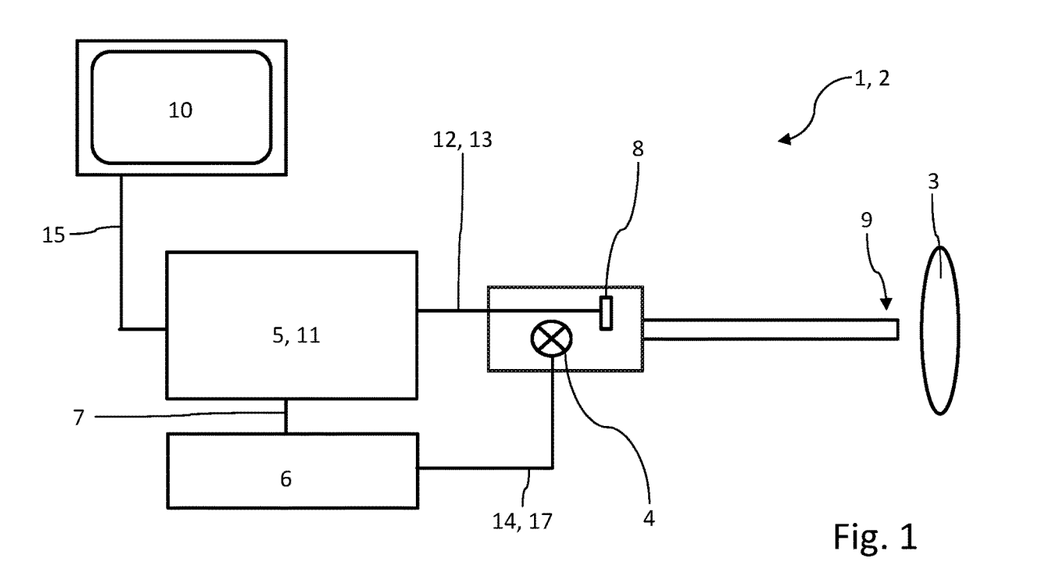
FIG. 1 shows a schematic overview of a possible embodiment of the image recording device, which is designed here as an endoscope.

FIG. 1 shows an image recording device identified as a whole with 1, which can be designed, for example, as an endoscope 2.

Figure 2:
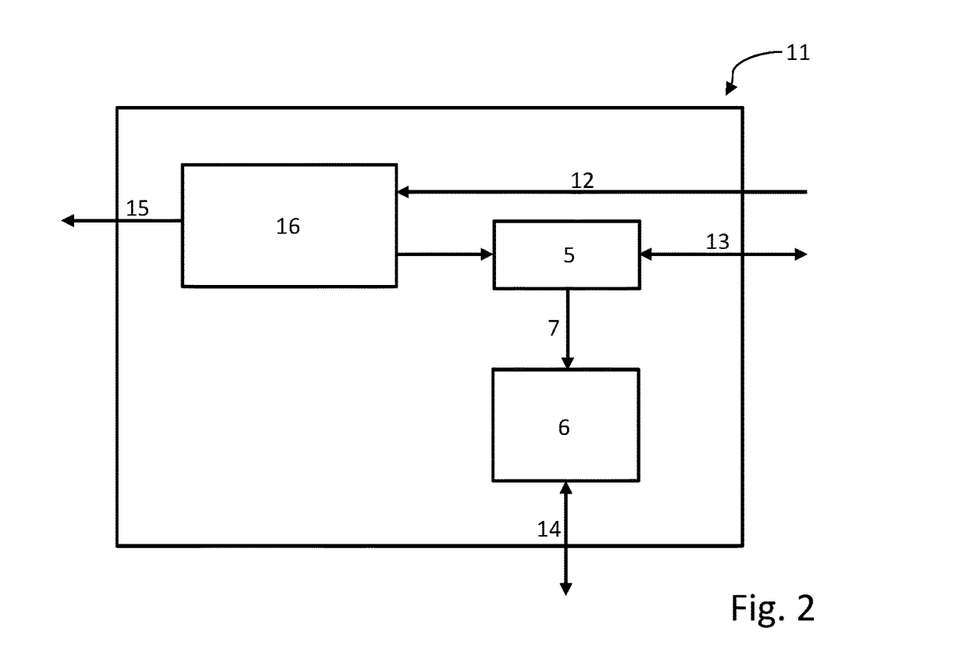
FIG. 2 shows a schematic illustration of a possible embodiment of a controller unit.

A detail view of a controller unit 11 is shown in a simplified schematic manner in FIG. 2.

The image recording device 1 is capable of recording a sequence of single images of a scene 3. Thus, for example, a video sequence of the scene 3 can be recorded.

The image recording device 1 comprises an illumination unit 4, the emission region of which is oriented in the usage position onto the scene 3 to be recorded, while a field of view of an image sensor 8 of the image recording device 1 is also oriented on the scene 3. The illumination unit 4 is thus suitable for illuminating the scene 3 during the recording of the sequence of single images. A settable light intensity 48 of the illumination unit 4 can be characterized in this case by an illumination variable 47. The illumination variable 47 thus relates at least to a parameter by which a current value of the light intensity 48 emitted by the illumination unit 4 is determinable or determined directly or indirectly. The illumination variable 47 can also correspond in this case to a light intensity 48 emitted by the illumination unit 4.

The image recording device 1 furthermore comprises an exposure controller 5, which is configured for controlling an exposure parameter 46. The setting of the exposure parameter 46 is preferably performed automatically by the exposure controller 5 in a first control loop. The exposure controller 5 is connected via a control line 13 to the image sensor 8. For example, the control line 13 can be a bidirectional control line. This has the advantage that only one control line is required for emission and reception, which reduces the overall space requirement.

To be able to perform a setting of the above-mentioned illumination variables 47, in particular automatically, the image recording device 1 additionally comprises an illumination controller 6, which is configured to set the illumination variable 47 in a second control loop.

Exposure controller 5 and illumination controller 6 can be combined to form the controller unit 11.

A single image is thus acquired by the image sensor 8 and transmitted via an image data transmission line 12, in particular a video line, from the image sensor 8 to the camera controller unit (abbreviated CCU) 11. Processing of the single images takes place in the controller unit 11, for example, video processing (in particular by method steps such as video sensor processing, video signal processing, and/or video output processing). A processed sequence, for example, as a video, is transmitted from the controller unit 11 via a signal line 15 to a display unit 10. The display unit 10 can be designed, for example, as a display screen and is configured for displaying the recorded single images.

During the processing of the image data by the controller unit 11, the image signal of the recorded single image is transmitted to the exposure controller 5. A computation of the exposure parameter 46 (in particular of the amplification factor 33 and the exposure time 34) is then performed by the exposure controller 5.

The ascertained value of the exposure parameter 46 is subsequently transmitted to the illumination controller 6 and/or to the image sensor 8. A transmission from the exposure controller 5 to the illumination controller 6 occurs in this case via a control connection 7.

The illumination controller 6 is connected via a control line 14 to the illumination unit 4. The control line 14 can be designed in particular as a bidirectional control line. This has the advantage that only one control line is required for transmission and reception, which reduces the overall space requirement. In this design, the illumination unit 4 can thus be arranged spatially separated from the illumination controller 6. For example, in this case the illumination unit 4 can be arranged in an endoscope tip 9 and/or the illumination controller 6 can be arranged on the controller unit 11.

According to an alternative design, the illumination unit 4 can also be arranged and/or designed farther away from the endoscope tip 9, for example, as a combined unit with the illumination controller 6 (not shown in the figures). In this case, for example, a transmission of the light emitted by the illumination unit 4 can take place via a light guide 17 up to the endoscope tip 9 to be able to illuminate the scene 3.

To be able to avoid "pumping of the brightness" as much as possible or at least reduce it to a minimum, the illumination unit 4 and/or the illumination controller 6 can be configured to perform a change of the brightness level step-by-step. A step-by-step change is dependent in this case on the illumination unit 4 and/or on a distance of a current value of the illumination variable 47 from a target value and/or an optimum regulating range 30 of the illumination variable 47. If, for example, a recorded single image is excessively dark, the illumination unit 4 has to be adjusted brighter rapidly to have a less noisy image, so that large change steps are used.

It can be provided in this case that the illumination unit 4 is designed as a pulsed light source. The illumination unit 4 and/or the illumination controller 6 can be configured in this case in such a way that at a flash frequency of 60 Hz of the illumination unit 4, a change of the illumination variable 47 is possible at an interval of at most 25 ms, in particular at an interval of at most 20 ms, in particular at an interval of at most 16.6 ms. Alternatively or additionally, it can be configured in such a way that at a flash frequency of 50 Hz of the illumination unit 4, a change of the illumination variable 47 is possible at an interval of at most 30 ms, in particular at an interval of at most 25 ms, in particular at an interval of at most 20 ms.

An automatic setting of the illumination variable 47 by the illumination controller 6 is thus performed in dependence on a current value of the exposure parameter 46, since because of the control connection 7, a transmission of a current value of the exposure parameter 46 to the illumination controller 6 is possible. The exact regulation can be performed in this case, for example, by the image recording method 100 described hereafter (see FIG. 3).

Figure 3:
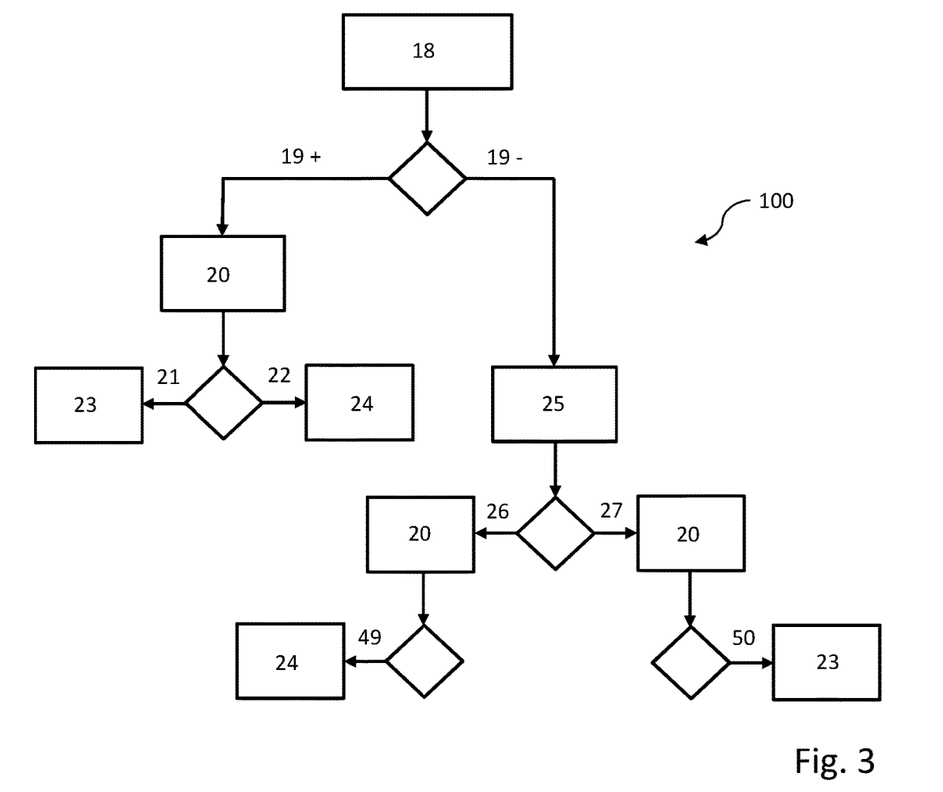
FIG. 3 shows a simplified schematic overview of a possible embodiment of the image recording method according to the invention.

The image recording method 100 is thus used for recording a sequence of single images of a scene 3, as was already described above with reference to the image recording device 1.

The image recording method 100 comprises a first control loop, by which a setting of an exposure parameter 46 is performed in dependence on a respective brightness value of a single image already recorded by the image recording device 1.

In particular in medical applications of the image recording device 1 and/or the image recording method 100, it is to be ensured that a heat development which results due to the illumination unit 4 on examined tissue is kept as low as possible.

In previous image recording devices and image recording methods, the setting of an illumination variable 47 was generally performed manually by a user. However, this had the disadvantage that either an optimum exposure situation did not prevail, or the heat development was in a critical range since, for example, the light intensity 48 of the illumination unit 4 is set excessively high.

The invention wishes to provide aid here to enable a more appropriate setting of the light intensity 48. This therefore takes place according to the invention in dependence on the exposure parameter 46.

A check 18 is performed by the image recording method 100 as to whether a regulating reserve 19 of the exposure parameter 46 is present before a setting of the illumination variable 47 is performed.

Figure 4:
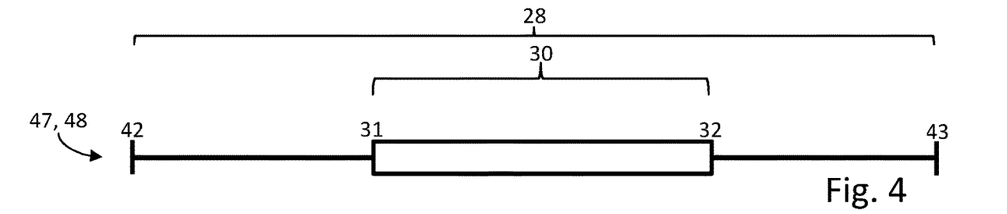
FIG. 4 shows an overall regulating range of the illumination variables.

To be able to avoid excessively strong heat development, firstly an optimum regulating range 30 of the illumination variable 47 can be defined or a predefined optimum regulating range 30 can be selected. The optimum regulating range 30 is within an overall regulating range 28 of the illumination variable 47 in this case.

An automated change of the illumination variable 47 can be performed in dependence on multiple situations, which are described in detail hereafter.

Figure 5:
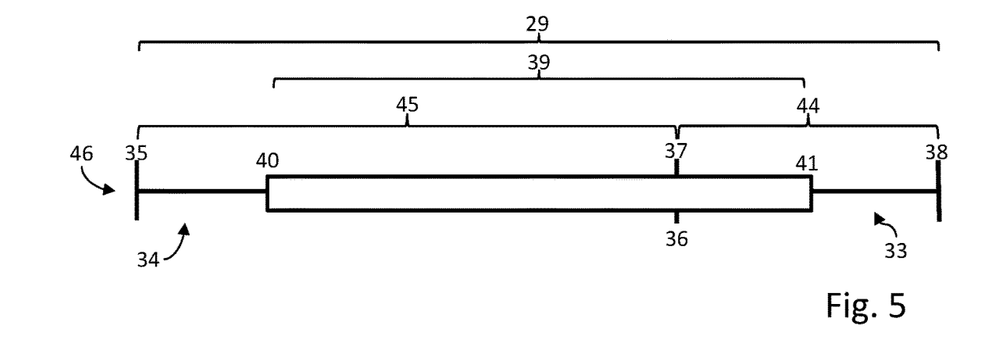
FIG. 5 shows an overall regulating range of the exposure parameter, wherein this is comprised of exposure time and amplification factor.

The limits of the regulating reserve 19 can correspond in this case, for example, to the limiting values 40, 41 of an optimum regulating range 39 of exposure parameter 46. The optimum regulating range 39 can be predefined in this case or set by the users. The optimum regulating range 39 is within an overall regulating range 29 of the exposure parameter 46 here. As shown in FIG. 5, the optimum regulating range 39 is defined by a lower limiting value 40, which is within an overall regulating range 45 of the exposure time 34, wherein the upper limiting value 41 is within an overall regulating range 44 of the amplification factor 33. During the regulation of the exposure parameter 46, firstly a regulating range of the exposure time 34 is thus exhausted up to a maximum exposure time 36, at which the amplification factor corresponds to a minimal amplification factor 37 (for example, value 1.0, corresponds to dB min). If a further increase of the exposure parameter 46 is required, after reaching the maximum exposure time 36, an increase of the amplification factor 33 is performed up to an upper limiting value 41 of the exposure parameter 46.

A desired result of the image recording method 100 is always a setting of the illumination variable 47 within the optimum regulating range 30 and, if the illumination variable 47 enables it, a setting of the exposure parameter 46 within the optimum regulating range 39. The setting of the illumination variable 47 is thus performed with priority over the setting of the exposure parameter 46.

After checking a current value of the exposure parameter 46, it is compared how far away this is from a lower limiting value 40 or an upper limiting value 41 of the optimum regulating range 39 of the exposure parameter 46. The respective distance to the limiting values 40, 41 represents the regulating reserve 19.

In dependence on whether a regulating reserve 19 is present (+) or is not present (−), a different method sequence takes place, as shown in FIG. 3.

In principle, the regulation of the illumination variable 47 and the regulation of the exposure parameter 46 take place in opposition. In the case of an increase of the illumination variable 47, a reduction of the exposure parameter 46 takes place. In the case of a reduction of the illumination variable 47, an increase of the exposure parameter 46 takes place.

If a regulating reserve 19 is present, a check 20 of the illumination variable 47 thus takes place. If a current value of the illumination variable 47 is within the optimum regulating range 30, no further action thus takes place.

If a current value is less than or equal to 21 the lower limiting value 31 of the illumination variable 47, the illumination variable 47 is thus adjusted upward until a new current value is within the optimum regulating range 30. The exposure parameter 46 can be reduced at the same time.

If a current value is greater than or equal to 22 the upper limiting value 32 of the illumination variable 47, the illumination variable is thus adjusted downward until a new current value is within the optimum regulating range 30. The exposure parameter 46 can be increased at the same time.

If no regulating reserve is present, a check 25 takes place as to whether a current value of the exposure parameter 46 is less than or equal to 26 the lower limiting value 40 of the exposure parameter 46 or is greater than or equal to 27 the upper limiting value 41 of the exposure parameter 46.

In the case of situation 26 (current value is less than or equal to the lower limiting value 40), an unnecessarily high temperature development can exist. A check 20 takes place of the illumination variable 47. If a situation 49 exists, that a current value of the illumination variable 47 is greater than the lower limiting value 31 of the illumination variable 47, a reduction 24 of the illumination variable 47 thus takes place, wherein a newly set value of the illumination variable 47 is greater than or equal to the lower limiting value 31.

In the case of situation 27 (current value is greater than or equal to the upper limiting value 41), a poor image quality can exist, for example, because of noise, since in particular the amplification factor 33 can be set excessively high. A check 20 of the illumination variable 47 takes place. If a situation 50 exists, that a current value of the illumination variable 47 is less than the upper limiting value 32 of the illumination variable 47, an increase of the illumination variable 47 thus takes place, wherein a newly set value of the illumination variable 47 is less than or equal to the upper limiting value 31. In other cases, it can be provided that no action occurs.

The exposure parameter 46 can be a single parameter or multiple parameters, for example an amplification factor 33 and/or an exposure time 34 and/or an aperture setting.

The exemplary embodiment illustrated in the figures involves an exposure parameter 46 composed of a regulating range 45 of the exposure time 34 and a regulating range 44 of the amplification factor 33.

The illumination variable 47 can be a parameter or a combination of two or more parameters selected from the group of a light intensity 48 of the illumination unit 4, a power consumption of the illumination unit 4, a temperature of the illumination unit 4, an ambient temperature, in particular of an endoscope tip 9, and/or a control signal of the illumination unit 4.

FIGS. 6-10 show a further exemplary embodiment. Components and functional units constructively and/or functionally equivalent or identical to the preceding exemplary embodiment are identified with the same reference signs and are not described separately once again. The statements on FIGS. 1-5 therefore apply accordingly to FIGS. 6-10.

The exemplary embodiment according to FIGS. 6-10 differs from the preceding exemplary embodiment in that at least one temperature sensor 51 is arranged in the endoscope tip 9. Two or more temperature sensors 51 can preferably be provided.

Figure 6:
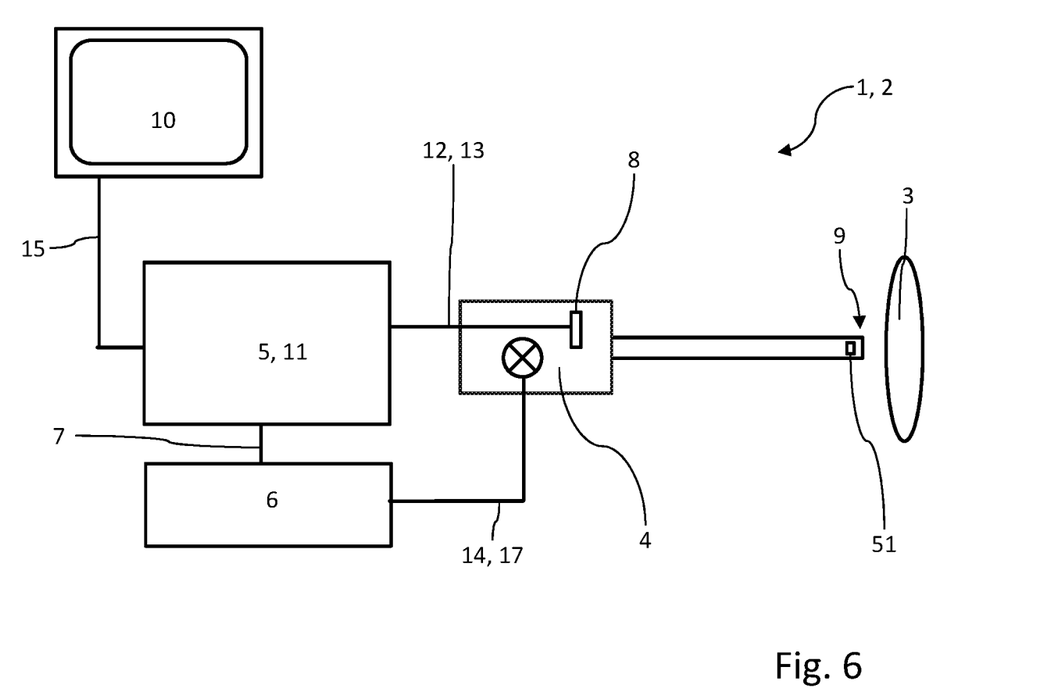
FIG. 6 shows a schematic overview of a further possible embodiment of the image recording device having additional temperature sensor.
Figure 7:
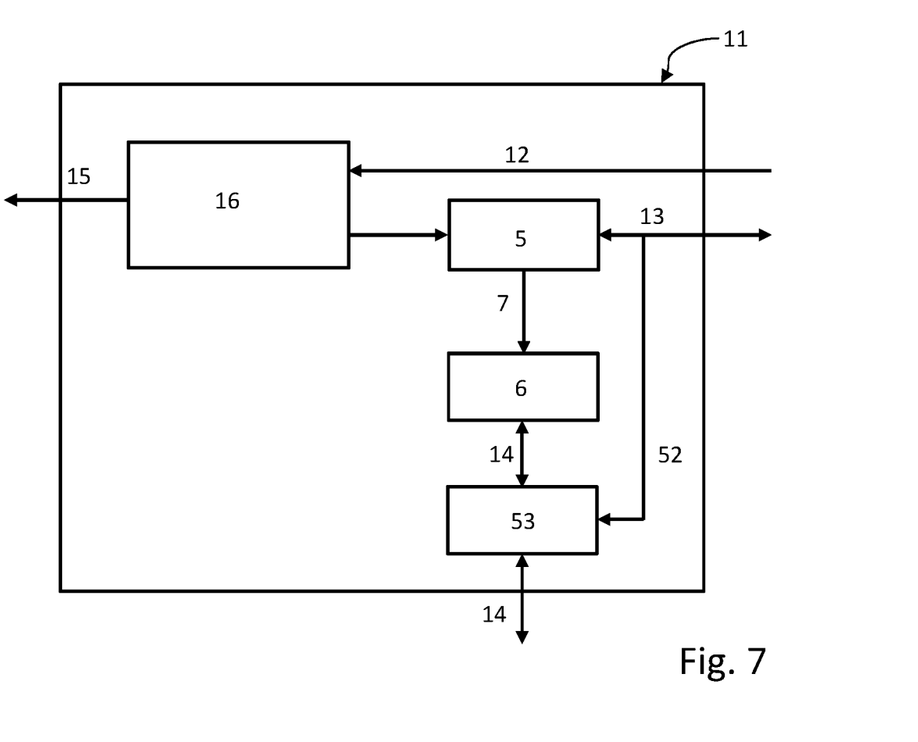
FIG. 7 shows a schematic illustration of a controller unit similar to FIG. 2 for the embodiment according to FIG. 6.

This temperature sensor 51 ascertains a temperature of the endoscope tip 9 and/or the surroundings and conducts the measured temperature as information 52 to a temperature analysis 53, for example, via the control line 13. The temperature analysis 53 is completed in a correspondingly configured unit according to the explanations of FIGS. 8 and 9. The temperature analysis 53 controls the illumination unit 4 via the control line 14.

Figure 8:
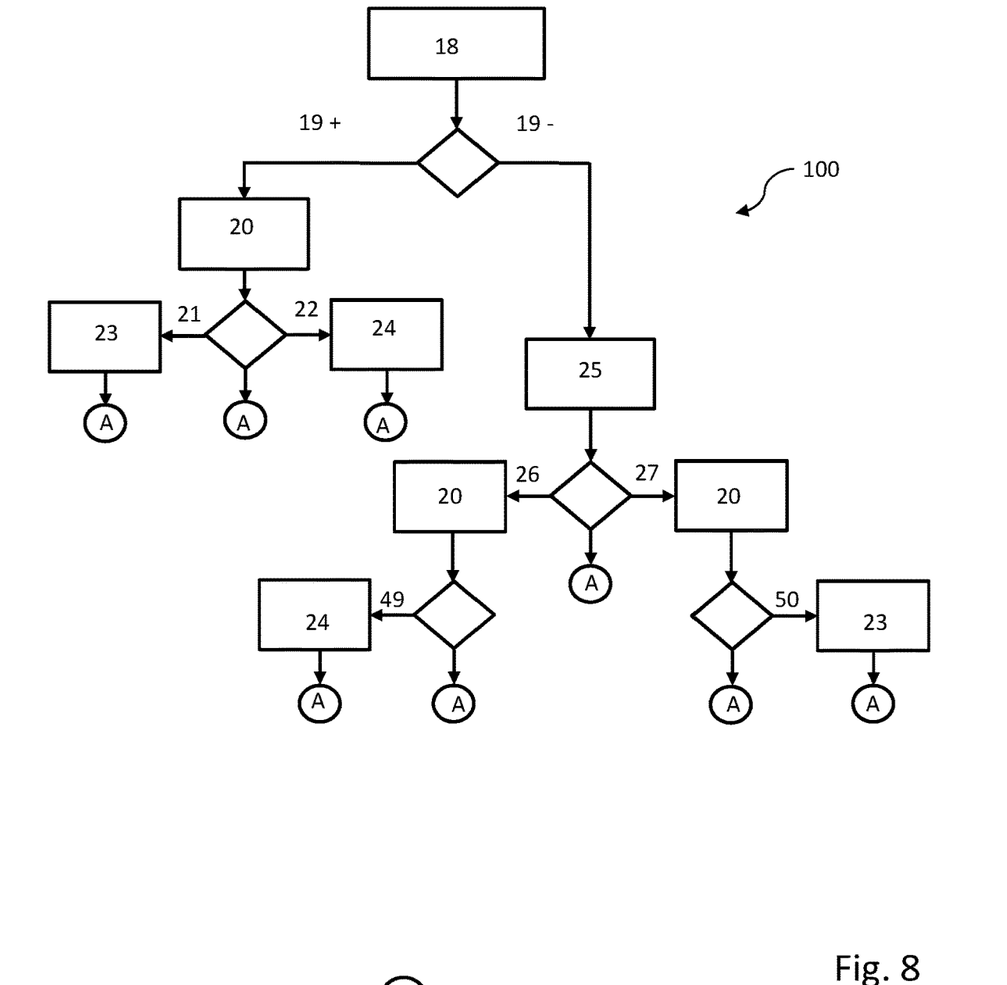
FIG. 8 shows a flow chart of an image recording method in the image recording device according to FIG. 6.
Figure 9:
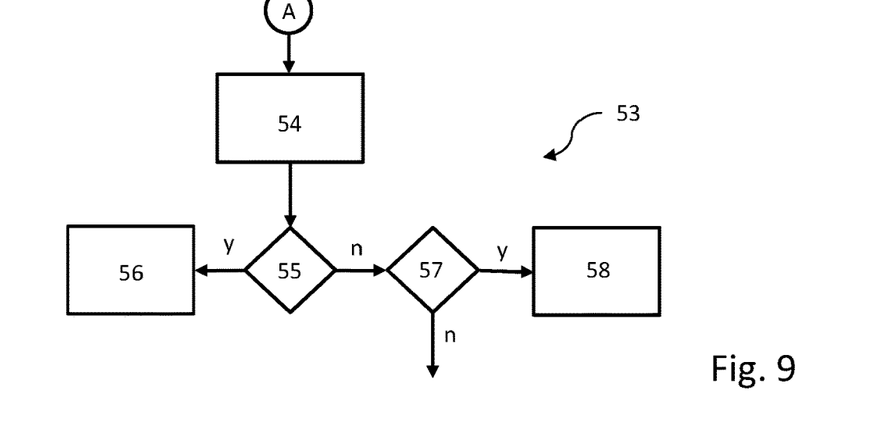
FIG. 9 shows a flow chart of the processing of the measured temperature value in the image recording device according to FIG. 6 in the flow chart according to FIG. 8.

FIG. 8 shows a program flow chart modified from FIG. 3. Each branch ends with a transfer point "A". The method according to FIG. 9 is attached at this transfer point. The method according to FIG. 9 is thus formed as subordinate to the method according to FIG. 8.

In the method according to FIG. 9, a threshold value comparison 55 takes place after the temperature measurement 54 using the temperature sensor 51. It is checked in this threshold value comparison 55 whether the measured temperature reaches or exceeds the temperature threshold value, which is stored and which indicates the risk of tissue damage.

If this is the case, the method is thus continued in the alternative "y". If this is not the case, the method is thus continued in the alternative "n".

In the alternative "y", the illumination variable 47 is reduced in step 56. This can be achieved either directly by engagement in the value of the illumination variable 47 or—as explained on the basis of FIG. 10—by changing the upper limiting value 32.

In the alternative "n", it is ascertained in step 57 whether regulating reserves exist which can be enabled. This can be the case, for example, if an upper limiting value 32 of the optimum regulating range of the illumination variable 47 can be increased or if an upper limiting value 41 of the optimum regulating range of the exposure parameter 46 can be reduced.

If a regulating reserve is present, the method is thus continued with the alternative "y". If a regulating reserve is not present, the method is thus left with the alternative "n" and possibly executed again cyclically.

In the alternative "y", the corresponding measure is now taken in step 58 to utilize the regulating reserve. Thus, for example, the illumination variable 47 or the associated upper limiting value 32 can be increased to effectuate or at least enable an increase of the light intensity. Alternatively or additionally, the upper limiting value 41 can be reduced to force an increase of the illumination variable 47.

Figure 10:
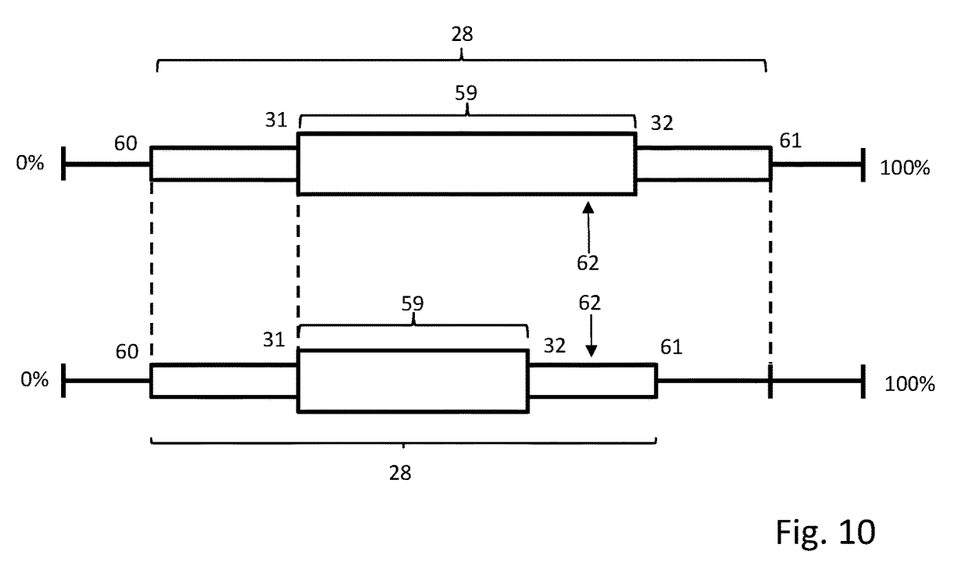
FIG. 10 shows an overall regulating range of the illumination variables to explain the flow chart according to FIG. 9.

FIG. 10 shows a more refined illustration in relation to FIG. 4 in order to explain it.

It is apparent that the technically accessible range does not extend from 0% to 100%, but rather ends at limits 60, 61. In the extreme case, the limits 60, 61 can also be at 0% and 100%, respectively. The regulating system is configured so that the illumination variable is to remain in the optimum operating range 59, wherein deviations within the limits 60, 61 are temporarily tolerated.

The upper image region of FIG. 10 shows the situation before the temperature limiting value is reached, the lower image region shows the situation after exceeding the temperature limiting value.

In step 56, the upper limiting value 32 or the upper limit 61 is reduced. The upper limiting value 32 can be moved with the upper limit 61 in this case. In this way, the optimum operating range 59 is reduced in size. In the example shown, the current value 62 of the illumination variable 47 moves out of the optimum operating range 59 due to this reduction. It is readjusted and has the result that the illumination variable 47 decreases. The illumination unit 4 thus becomes less bright and therefore develops less heat. In this variant, only an indirect engagement is made in the illumination variable 47. In further variants, the illumination variable 47 is directly reduced to achieve a direct reduction of the heat development.

In contrast, the lower limiting value 31 and the lower limit 60 remain unchanged in this method.

In the exemplary embodiments illustrated in the figures, the illumination variable 47 is a light intensity 48 of the illumination unit 4. The illumination variable 47 can in this case be, for example, a numeric ratio between a switched-on time and cycle time, between a switched-off time and cycle time, or between a switched-on-time and a switched-off time in the case of a light source operated in a cyclic or pulsed manner. In further exemplary embodiments, the light intensity 48 can be characterized by a power consumption of a light source.

The invention thus relates in particular to an image recording method 100 and an image recording device 1 for recording a sequence of single images of a scene 3, wherein the scene 3 is illuminated using an illumination unit 4, wherein a light intensity generated by the illumination unit 4 is characterized by an illumination variable 47, wherein a setting of the illumination variable 47 is performed as long as a regulating reserve 19 of an optimum regulating range 39 of the exposure parameter 46 is present, and wherein a setting of the illumination variable 47 is performed or repeated until the illumination variable 47 is within an optimum regulating range 30 of the illumination variable 47.

LIST OF REFERENCE SIGNS 1 image recording device
2 endoscope
3 scene
4 illumination unit
5 exposure controller
6 illumination controller
7 control connection
8 image sensor
9 endoscope tip
10 display unit
11 controller unit/CCU
12 image data transmission line/video line
13 control line to the image sensor
14 control line to the illumination unit
15 signal line to the display unit
16 general video processing path
17 light guide
18 check as to whether regulating reserve is present
19 regulating reserve
20 check of the value of the illumination variable
21 current value less than or equal to lower limiting value
22 current value greater than or equal to upper limiting value
23 increase of the illumination variable
24 reduction of the illumination variable
25 check of the value of the exposure parameter
26 exposure parameter less than or equal to lower limiting value
27 exposure parameter greater than or equal to upper limiting value
28 overall regulating range of the illumination variable
29 overall regulating range of the exposure parameter
30 optimum regulating range of the illumination variable
31 lower limiting value of the optimum regulating range of the illumination variable
32 upper limiting value of the optimum regulating range of the illumination variable
33 amplification factor
34 exposure time
35 minimal exposure time
36 maximal exposure time
37 minimal amplification factor
38 maximal amplification factor
39 optimum regulating range of the exposure parameter
40 lower limiting value of the optimum regulating range of the exposure parameter
41 upper limiting value of the optimum regulating range of the exposure parameter
42 0% light intensity/minimal illumination variable
43 100% light intensity/maximal illumination variable
44 overall regulating range of the amplification factor
45 overall regulating range of the exposure time
46 exposure parameter
47 illumination variable
48 light intensity 49 current value greater than or equal to lower limiting value
50 current value less than or equal to upper limiting value
51 temperature sensor
52 result of a temperature measurement
53 temperature analysis
54 temperature measurement
55 threshold value comparison
56 decrease illumination variable
57 ascertain regulating reserve
58 increase illumination variable
59 optimum operating range
60 lower limit of 28
61 upper limit of 28
62 current value of 47
100 image recording method

The invention claimed is:

1. An image recording method (100) for recording a sequence of single images of a scene (3) using an image recording device (1), the method comprising:
 illuminating the scene (3) using an illumination unit (4),
 setting an exposure parameter (46) in dependence on a respective brightness value of a single image in a first control loop, wherein a light intensity generated by the illumination unit (4) is characterized by an illumination variable (47),
 setting the illumination variable (47) in a second control loop as long as a regulating reserve (19) of the exposure parameter (46) is present, wherein the regulating reserve (19) of the exposure parameter (46) corresponds to a respective distance of a current value of the exposure parameter (46) to a lower limiting value (40) or an upper limiting value (41) of an optimum regulating range, in order to avoid excessive heat generation, and
 performing a check (18) as to whether the regulating reserve (19) of the exposure parameter (46) is present before the setting of the illumination variable (47) is performed.

2. The image recording method (100) as claimed in claim 1, further comprising:
 defining or predefining an optimum regulating range (30) of the illumination variable (47), which is within an overall regulating range (28) of the illumination variable (47), in the second control loop,
 performing a check (20) as to whether a current value of the illumination variable (47) is within the optimum regulating range (30) of the illumination variable (47),
 changing the illumination variable (47) if the current value of the illumination variable (47) is outside the optimum regulating range (30) of the illumination variable (47), until the current value of the illumination variable (47) is within the optimum regulating range (30) of the illumination variable (47).

3. The image recording method (100) as claimed in claim 2, wherein the limits of the regulating reserve (19) are defined or predefined by limiting values (37, 38, 40, 41) of an optimum regulating range (39) of the exposure parameter (46), wherein the optimum regulating range (39) is within an overall regulating range (29) of the exposure parameter (46), and the method further comprising changing the illumination variable (47) until a current value of the exposure parameter (46) is within the optimum regulating range (39) of the exposure parameter (46) and as long as a current value of the illumination variable (47) is within the optimum regulating range (30) of the illumination variable (47).

4. The image recording method (100) as claimed in claim 2, wherein regulation of the illumination variable (47) is not performed if a current value of the illumination variable (47) is within the optimum regulating range (30) of the illumination variable (47).

5. The image recording method (100) as claimed in claim 1, wherein the exposure parameter (46) is at least one of an amplification factor (33), an exposure time (34), or an aperture setting.

6. The image recording method (100) as claimed in claim 5, wherein the exposure parameter (46) is comprised of a regulating range (45) of an exposure time (34) and a regulating range (44) of an amplification factor (33), and the regulating range (44) of the amplification factor (33) begins after reaching a maximum exposure time (36).

7. The image recording method (100) as claimed in claim 1, wherein the illumination variable (47) is a parameter or a combination of two or more parameters from the group including a light intensity (48) of the illumination unit (4), a power consumption of the illumination unit (4), a temperature of the illumination unit (4), an ambient temperature, or a control signal of the illumination unit (4).

8. The image recording method (100) as claimed in claim 1, wherein setting of the illumination variable (47) is not performed if the exposure parameter (46) is outside the optimum regulating range (39) of the exposure parameter (46) and a current value of the illumination variable (47) corresponds to an upper limiting value (32) or a lower limiting value (31) of the optimum regulating range (30) of the illumination variable (47).

9. The image recording method (100) as claimed in claim 1, wherein the setting of the illumination variable (47) is performed iteratively.

10. The image recording method (100) as claimed in claim 1, wherein in the event of a change of the illumination variable (47), an opposing change of the exposure parameter (46) takes place.

11. The image recording method (100) as claimed in claim 1, further comprising:
 performing a measurement of at least one of a temperature of the illumination unit (4) or an ambient temperature, and if the measured temperature value reaches or exceeds a temperature limiting value, reducing at least one of the current value of the illumination variable (47) or an upper limiting value (32) of the optimum regulating range (30) of the illumination variable (47) to a lower value, or increasing an upper limiting value (41) of the optimum regulating range (39) of the exposure parameter (46).

12. The image recording method (100) as claimed in claim 11, wherein the upper limiting value (41) of the optimum regulating range (39) of the exposure parameter (46) is only increased if a current value of the exposure parameter (46), at the point in time of reaching or exceeding the temperature limiting value, corresponds to the original upper limiting value (41) of the optimum regulating range (39) of the exposure parameter (46).

13. The image recording method (100) as claimed in claim 11, wherein if one of the measured temperature value of the illumination unit (4) or the ambient temperature falls below one or the temperature limiting value, automatically checking whether an increase of at least one of the current value of the illumination variable (47) or an increase of the upper limiting value (32) of the optimum regulating range (30) of the illumination variable (47) or a reduction of the upper limiting value (41) of the optimum regulating range (39) of the exposure parameter (46).

14. The image recording method (100) as claimed in claim 1, wherein the image recording method (100) is executed using an image recording device (1) comprising as an endoscope (2), and at least one of an image sensor (8) or the illumination unit (4) are arranged in an endoscope tip (9).

15. The image recording method (100) as claimed in claim 1, wherein the illumination unit (4) comprises a pulsed light source, at a flash frequency of 60 Hz, and a change of the illumination variable (47) is performed at an interval of at most 25 ms.

16. An image recording device (1) for recording a sequence of single images of a scene (3), the image recording device (1) comprising:
- an illumination unit (4) for illuminating the scene (3), the illumination unit being configured to generate light having a light intensity (48) characterized by an illumination variable (47),
- an exposure controller (5) configured to control an exposure parameter (46) in dependence on a respective brightness value of a single image in a first control loop,
- an illumination controller (6) configured to control the illumination variable (47) in a second control loop as long as a regulating reserve (19) of the exposure parameter (46) is present, wherein the regulating reserve (19) of the exposure parameter (46) corresponds to a respective distance of a current value of the exposure parameter (46) to a lower limiting value (40) or an upper limiting value (41) of an optimum regulating range, in order to avoid excessive heat generation,
- a control connection (7) between the exposure controller (5) and the illumination controller (6), and
- the image recording device is configured to perform a check (18) as to whether the regulating reserve (19) of the exposure parameter (46) is present before setting the illumination variable (47).

17. The image recording device (1) as claimed in claim 16, wherein the illumination controller (6) is configured to set the illumination variable (47) in dependence on a current value of the exposure parameter (46).

18. The image recording device (1) as claimed in claim 16, wherein the image recording device (1) comprises an endoscope (2).

19. The image recording method (100) as claimed in claim 1, wherein the setting of the illumination variable (47) is performed with priority over the setting of the exposure parameter (46), such that a heat development which results due to the illumination unit (4) on the tissue to be examined is minimized.

* * * * *